United States Patent
Collins

(10) Patent No.: US 11,732,959 B2
(45) Date of Patent: Aug. 22, 2023

(54) REFRIGERATOR MIRROR WEIGHT MONITOR APPARATUS

(71) Applicant: Edward Collins, Oak Lawn, IL (US)

(72) Inventor: Edward Collins, Oak Lawn, IL (US)

( * ) Notice: Subject to any disclaimer, the term of this patent is extended or adjusted under 35 U.S.C. 154(b) by 493 days.

(21) Appl. No.: 17/082,174

(22) Filed: Oct. 28, 2020

(65) Prior Publication Data
US 2022/0128296 A1   Apr. 28, 2022

(51) Int. Cl.
*A47G 1/02* (2006.01)
*F25D 29/00* (2006.01)
*G01G 19/44* (2006.01)

(52) U.S. Cl.
CPC ............. *F25D 29/005* (2013.01); *A47G 1/02* (2013.01); *G01G 19/44* (2013.01); *F25D 2400/18* (2013.01); *F25D 2400/36* (2013.01)

(58) Field of Classification Search
CPC ........ G01G 19/44; A47G 1/02; F25D 29/005; F25D 2400/18; F25D 2400/36
See application file for complete search history.

(56) References Cited

U.S. PATENT DOCUMENTS

| | | | |
|---|---|---|---|
| 6,864,436 B1 * | 3/2005 | Nobes | G01G 23/3728 177/126 |
| 7,138,586 B1 | 11/2006 | Kim | |
| 7,355,131 B2 * | 4/2008 | Pathmanathan | A47B 67/00 177/144 |
| D589,068 S | 3/2009 | Lee | |
| 8,371,135 B2 | 2/2013 | Lee | |
| 8,382,220 B2 | 2/2013 | Kim | |
| 8,698,014 B1 * | 4/2014 | Walstad | G01G 19/44 177/126 |
| 10,052,026 B1 | 8/2018 | Tran | |
| 10,602,861 B2 | 3/2020 | Meyers | |
| 2005/0132740 A1 | 6/2005 | Kwon | |
| 2006/0122532 A1 | 6/2006 | Lee | |
| 2011/0240379 A1 * | 10/2011 | Forshaw | G01G 19/44 177/1 |

* cited by examiner

*Primary Examiner* — Randy W Gibson

(57) ABSTRACT

A refrigerator mirror weight monitor apparatus for weight loss assistance includes a frame and a plurality of mounting strips to selectively engage the frame with a refrigerator or pantry door. A mirror is coupled to the frame and a housing extends from the mirror to a frame top side. A display is coupled to the housing. A CPU is coupled within the housing and is in operational communication with the display. A memory, a receiver, and a battery are coupled within the housing and are in operational communication with the CPU. A sensor has a sensor housing, a weight monitor coupled within the sensor housing, and a transmitter coupled within the sensor housing. The transmitter is in operational communication with the weight monitor and in wireless communication with the receiver.

8 Claims, 5 Drawing Sheets

REFRIGERATOR MIRROR WEIGHT MONITOR APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to weight monitoring devices and more particularly pertains to a new weight monitoring device for weight loss assistance.

(2) Description of Related Art Including Information Disclosed Under 37 CFR 1.97 and 1.98

The prior art relates to weight monitoring devices. Known devices are often integrated into refrigerators and are not separately attached or powered. These devices thus cannot be used on pantry doors as well. Known devices also do not include a mirror to provide users with additional visual motivation.

BRIEF SUMMARY OF THE INVENTION

An embodiment of the disclosure meets the needs presented above by generally comprising a frame having a frame back side, frame top side, a frame bottom side, a frame left side, and a frame right side. A plurality of mounting strips is coupled to the frame back side. The plurality of mounting strips is configured to selectively engage the frame with a refrigerator or pantry door. A mirror is coupled to the frame. The mirror is coupled to the frame bottom side and extends from the frame left side to the frame right side. A housing is coupled to the frame. The housing extends from the mirror to the frame top side. A display is coupled to the housing. A CPU is coupled within the housing and is in operational communication with the display. A memory, a receiver, and a battery are coupled within the housing and are in operational communication with the CPU. A sensor has a sensor housing, a weight monitor coupled within the sensor housing, and a transmitter coupled within the sensor housing. The transmitter is in operational communication with the weight monitor and in wireless communication with the receiver.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
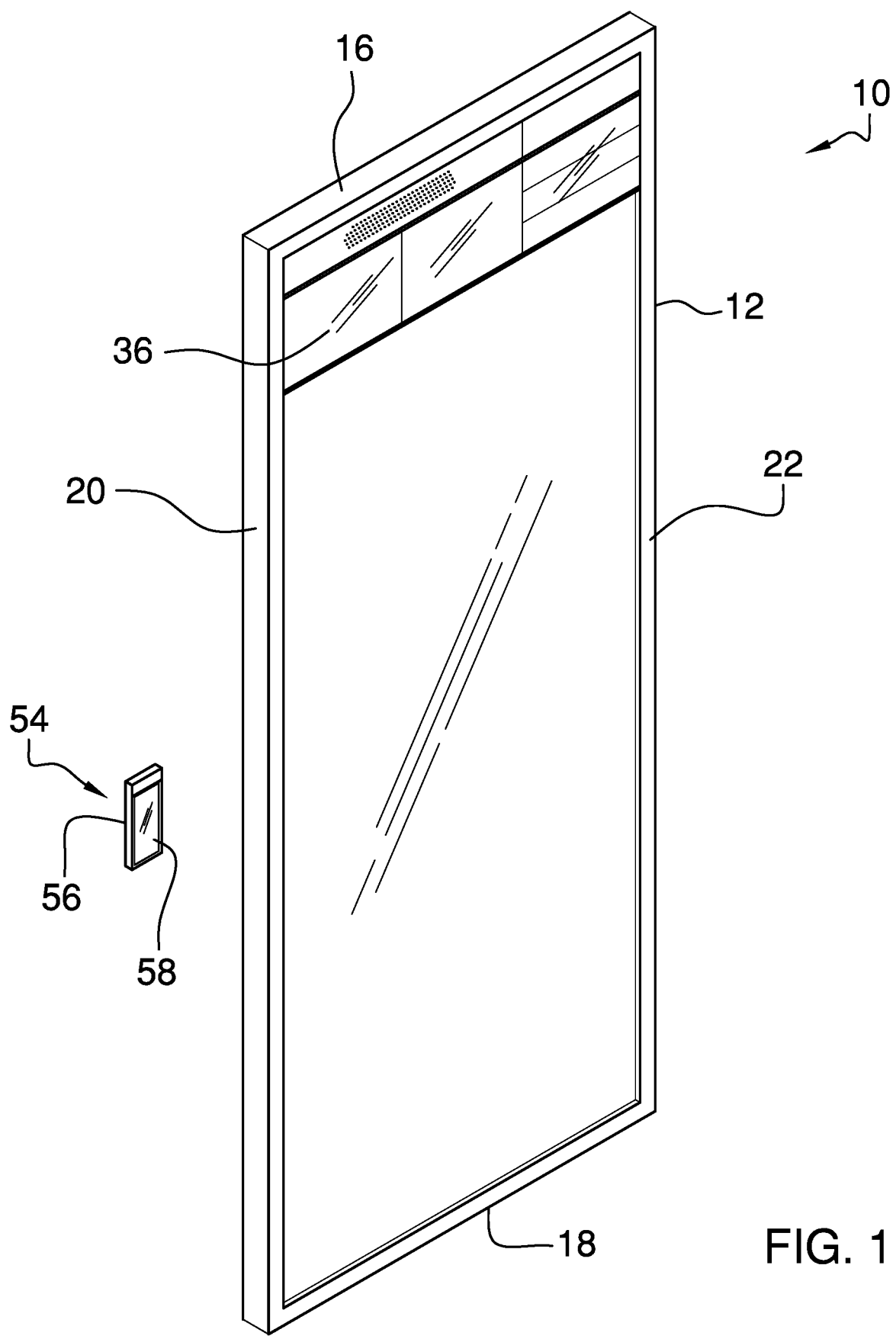
FIG. 1 is an isometric view of a refrigerator mirror weight monitor apparatus according to an embodiment of the disclosure.
Figure 2:
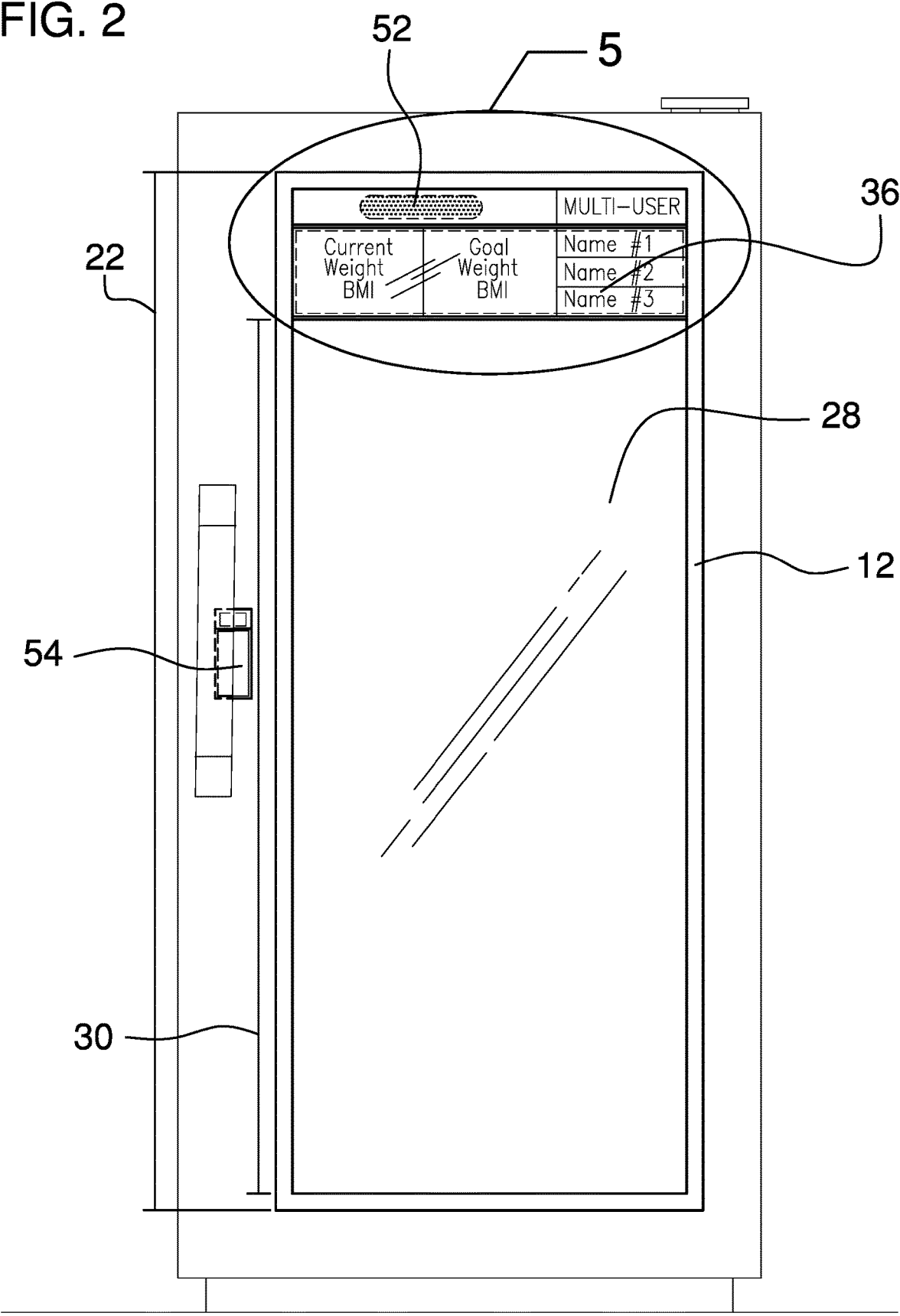
FIG. 2 is a front elevation view of an embodiment of the disclosure.
Figure 3:
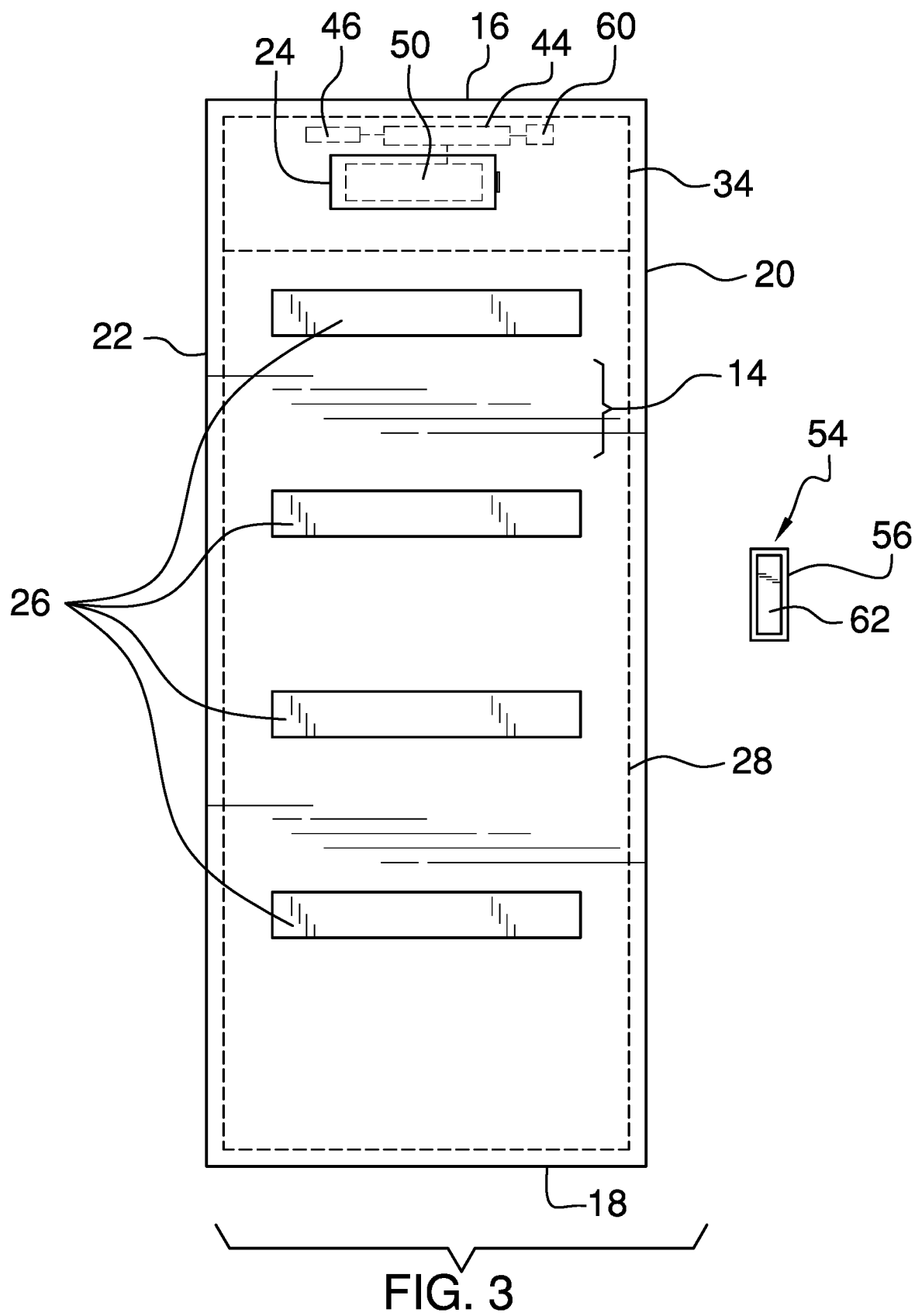
FIG. 3 is a rear view of an embodiment of the disclosure.
Figure 4:
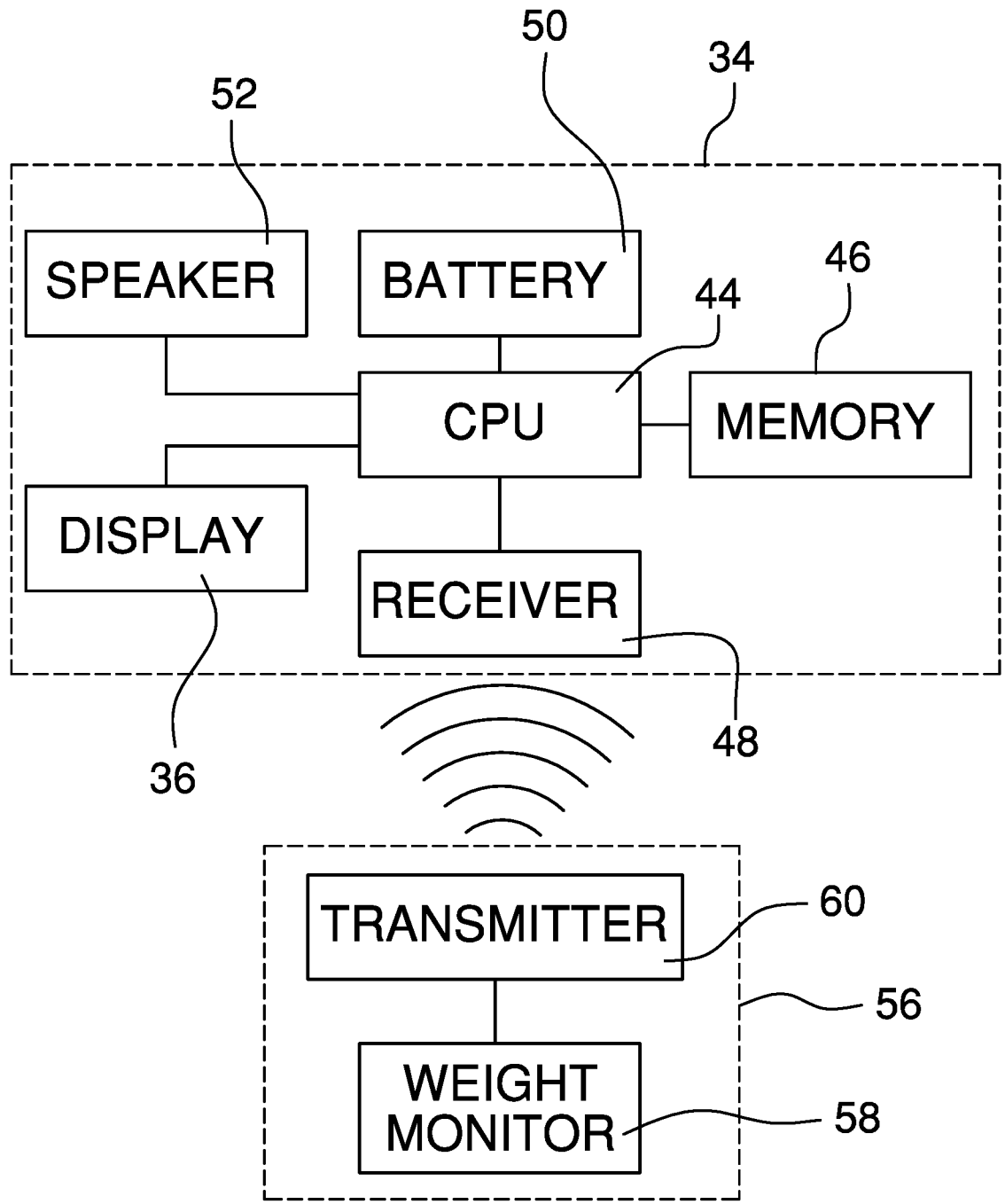
FIG. 4 is a block diagram of an embodiment of the disclosure.
Figure 5:
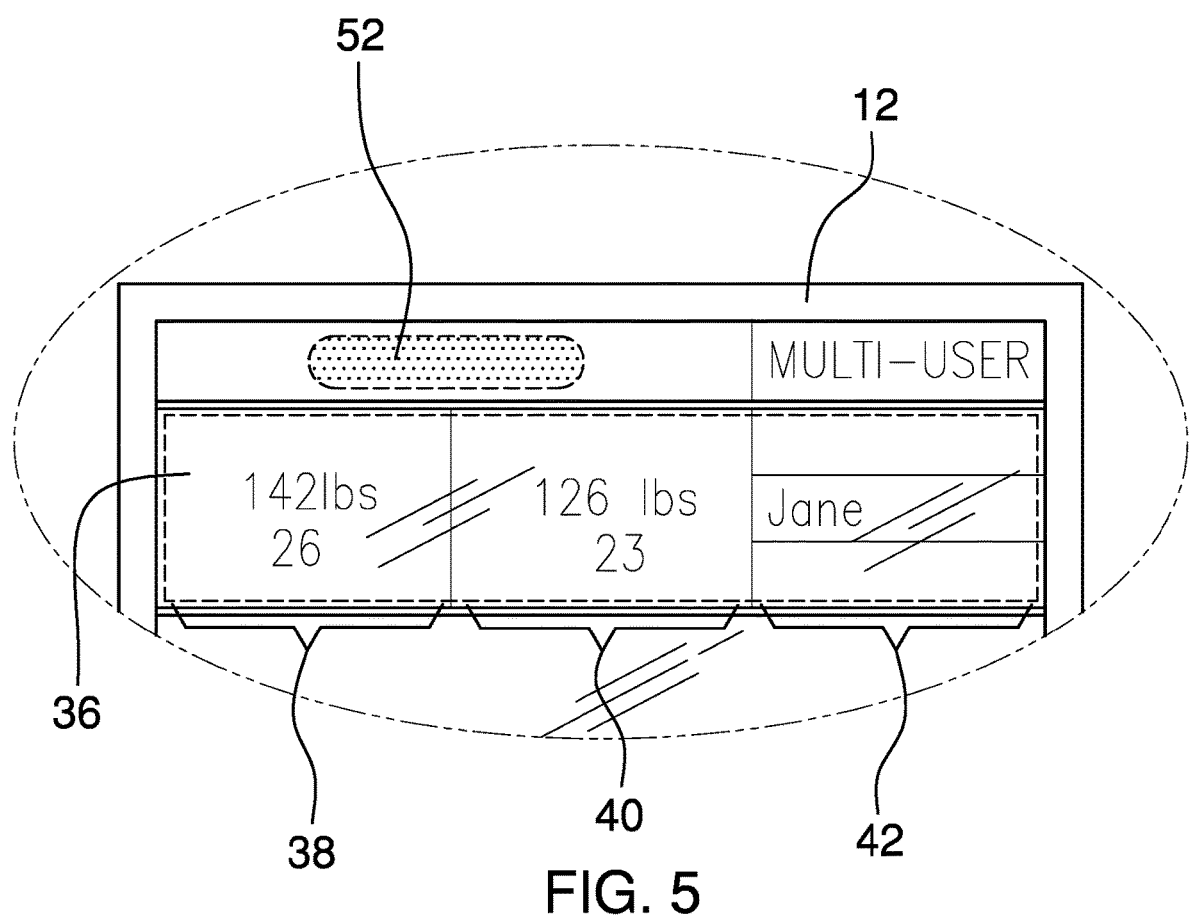
FIG. 5 is a detail view of an embodiment of the disclosure.

With reference now to the drawings, and in particular to FIGS. 1 through 5 thereof, a new weight monitoring device embodying the principles and concepts of an embodiment of the disclosure and generally designated by the reference numeral 10 will be described.

As best illustrated in FIGS. 1 through 5, the refrigerator mirror weight monitor apparatus 10 generally comprises a frame 12 having a frame back side 14, frame top side 16, a frame bottom side 18, a frame left side 20, and a frame right side 22. The frame back side 14 may have a removable battery door 24.

A plurality of mounting strips 26 is coupled to the frame back side 14. The plurality of mounting strips 26 is configured to selectively engage the frame 12 with a refrigerator or pantry door. Each of the plurality of mounting strips 26 may be a horizontal magnetic strip 26 or other selectively engageable strip such as an adhesive.

A mirror 28 is coupled to the frame 12. The mirror 28 is coupled to the frame bottom side 18 and extends from the frame left side 20 to the frame right side 22. A mirror height 30 of the mirror may be equal to at least 80% of a frame height 32 of the frame. A housing 34 is coupled to the frame 12 and extends from the mirror 28 to the frame top side 16.

A display 36 is coupled to the housing 34. The display 36 may have a current portion 38 to show the user's current weight and BMI, a goal portion 40 to show the user's target weight and BMI, and a name portion 42 to display the current user's name while allowing for multiple users. A CPU 44 is coupled within the housing 34 and is in operational communication with the display 36. A memory 46, a receiver 48, and a battery 50 are coupled within the housing 34 and are in operational communication with the CPU 44. The battery 50 is positioned adjacent the removable battery door 24 to allow for easy changes. A speaker 52 may be coupled to the housing 34 and is in operational communication with the CPU 44 to provide an audible reading of the information being shown on the display 36.

A sensor 54 includes a sensor housing 56, a weight monitor 58 coupled within the sensor housing 56, and a transmitter 60 coupled within the sensor housing 56 and in operational communication with the weight monitor 58. The sensor 54 and the weight monitor 58 detect which user is activating the apparatus 10 and reads his or her current weight. The transmitter 60 is in wireless communication with the receiver 48 to allow the CPU 44 to show the user's current weight and to calculate the user's BMI given information that was previously programmed into the memory 46. The sensor 54 may have a sensor magnet 62 coupled to the sensor housing 56 to mount the sensor 54.

In use, the user activates the sensor 54 to see a comparison of his or her current versus goal weight and BMI. The user may also examine his or her reflection in the mirror 28 and thus can use this visual in conjunction with the information on the display 36 to make the best dietary choices possible.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mirror weight monitor apparatus comprising:
a refrigerator or a pantry having a door;
a frame having a frame back side, frame top side, a frame bottom side, a frame left side, and a frame right side;
a plurality of mounting strips coupled to the frame back side, the plurality of mounting strips selectively engaging the frame with the refrigerator or the door of the pantry;
a mirror coupled to the frame, the mirror being coupled to the frame bottom side and extending from the frame left side to the frame right side;
a housing coupled to the frame, the housing extending from the mirror to the frame top side;
a display coupled to the housing;
a CPU coupled within the housing, the CPU being in operational communication with the display;
a memory coupled within the housing, the memory being in operational communication with the CPU;
a receiver coupled within the housing, the receiver being in operational communication with the CPU;
a battery coupled within the housing, the battery being in operational communication with the CPU; and
a sensor, the sensor having a sensor housing, a weight monitor coupled within the sensor housing, and a transmitter coupled within the sensor housing and in operational communication with the weight monitor, the transmitter being in wireless communication with the receiver.

2. The refrigerator mirror weight monitor apparatus of claim 1 further comprising a speaker coupled to the housing, the speaker being in operational communication with the CPU.

3. The refrigerator mirror weight monitor apparatus of claim 1 further comprising the display having a current portion to show the user's current weight and BMI, a goal portion to show the user's target weight and BMI, and a name portion to display the user's name that currently activated the sensor.

4. The refrigerator mirror weight monitor apparatus of claim 1 further comprising each of the plurality of mounting strips being a horizontal magnetic strip.

5. The refrigerator mirror weight monitor apparatus of claim 1 further comprising the sensor having a sensor magnet coupled to the sensor housing.

6. The refrigerator mirror weight monitor apparatus of claim 1 further comprising the frame back side having a removable battery door.

7. The refrigerator mirror weight monitor apparatus of claim 1 further comprising a mirror height of the mirror being equal to at least 80% of a frame height of the frame.

8. A mirror weight monitor apparatus comprising:
a refrigerator or a pantry having a door;
a frame having a frame back side, frame top side, a frame bottom side, a frame left side, and a frame right side, the frame back side having a removable battery door;
a plurality of mounting strips coupled to the frame back side, the plurality of mounting strips selectively engaging the frame with the refrigerator or the door of the pantry, each of the plurality of mounting strips being a horizontal magnetic strip;
a mirror coupled to the frame, the mirror being coupled to the frame bottom side and extending from the frame left side to the frame right side, a mirror height of the mirror being equal to at least 80% of a frame height of the frame;
a housing coupled to the frame, the housing extending from the mirror to the frame top side;
a display coupled to the housing, the display having a current portion to show the user's current weight and BMI, a goal portion to show the user's target weight and BMI, and a name portion to display the current user's name;
a CPU coupled within the housing, the CPU being in operational communication with the display;
a memory coupled within the housing, the memory being in operational communication with the CPU;
a receiver coupled within the housing, the receiver being in operational communication with the CPU;
a speaker coupled to the housing, the speaker being in operational communication with the CPU;
a battery coupled within the housing, the battery being in operational communication with the CPU; and
a sensor, the sensor having a sensor housing, a weight monitor coupled within the sensor housing, and a transmitter coupled within the sensor housing and in operational communication with the weight monitor, the transmitter being in wireless communication with the receiver, the sensor having a sensor magnet coupled to the sensor housing.

\* \* \* \* \*